(12) United States Patent
Doptis et al.

(10) Patent No.: US 11,010,975 B1
(45) Date of Patent: May 18, 2021

(54) REMOTE CAMERA AUGMENTED REALITY SYSTEM

(71) Applicant: Velan Studios, Inc., Latham, NY (US)

(72) Inventors: Daniel Doptis, Troy, NY (US); Jan-Erik Steel, Old Chatham, NY (US); Edward Tumbusch, Latham, NY (US); Karthik Bala, Menands, NY (US)

(73) Assignee: Velan Studios, Inc., Latham, NY (US)

( * ) Notice: Subject to any disclaimer, the term of this patent is extended or adjusted under 35 U.S.C. 154(b) by 0 days.

(21) Appl. No.: 16/294,536

(22) Filed: Mar. 6, 2019

Related U.S. Application Data

(60) Provisional application No. 62/639,397, filed on Mar. 6, 2018, provisional application No. 62/639,398, filed on Mar. 6, 2018, provisional application No. 62/639,400, filed on Mar. 6, 2018, provisional application No. 62/639,402, filed on Mar. 6, 2018, provisional application No. 62/639,404, filed on Mar. 6, 2018.

(51) Int. Cl.
*G06T 19/00* (2011.01)
*A63F 13/803* (2014.01)
*A63F 13/217* (2014.01)
*G06T 7/73* (2017.01)

(52) U.S. Cl.
CPC .......... *G06T 19/006* (2013.01); *A63F 13/217* (2014.09); *A63F 13/803* (2014.09); *G06T 7/74* (2017.01)

(58) Field of Classification Search
CPC ................................................... G06T 19/006
See application file for complete search history.

(56) References Cited

U.S. PATENT DOCUMENTS

| | | | |
|---|---|---|---|
| 6,535,793 | B2 | 3/2003 | Allard |
| 7,714,895 | B2 | 5/2010 | Pretlove et al. |
| 7,920,071 | B2 | 4/2011 | Baillot |
| 9,195,231 | B2 | 11/2015 | Parente Da Silva |
| 9,283,674 | B2 | 3/2016 | Hoffman et al. |
| 9,741,173 | B2 | 8/2017 | Parente Da Silva |

(Continued)

FOREIGN PATENT DOCUMENTS

| | | | |
|---|---|---|---|
| WO | 2018/197853 A1 | 11/2018 | |
| WO | 2018/216312 A1 | 11/2018 | |
| WO | 2019/227905 A1 | 5/2019 | |

*Primary Examiner* — Yi Yang
(74) *Attorney, Agent, or Firm* — Socal IP Law Group LLP; Jonathan Pearce

(57) ABSTRACT

There is disclosed a system for remote tracking of augmented reality media through a real-world environment. The system may use an augmented reality platform incorporating a camera and motion sensors to move about a physical space while an augmented reality object or characters are superimposed within that physical space. The augmented reality platform may move intelligently to keep the augmented reality media within frame as it moves or is adjusted. The augmented reality platform may present a basis upon which to build upon for superimposing augmented reality elements onto augmented reality media and the augmented reality platform as they move about within a space together. The platform may be used, for example, in a racing or platforming style game or experience.

16 Claims, 11 Drawing Sheets

(56) References Cited

U.S. PATENT DOCUMENTS

| | | | |
|---|---|---|---|
| 9,779,550 B2 | 10/2017 | Tobita | |
| 9,880,553 B1 | 1/2018 | Hoffmann et al. | |
| 9,996,978 B2 | 6/2018 | Olson et al. | |
| 10,424,119 B2 | 9/2019 | Parente Da Silva | |
| 10,474,228 B2 | 11/2019 | Niccolini et al. | |
| 2013/0050500 A1* | 2/2013 | Makino | H04N 13/356 348/169 |
| 2013/0063487 A1* | 3/2013 | Spiegel | G06Q 30/02 345/633 |
| 2013/0158778 A1* | 6/2013 | Tengler | G06K 9/00845 701/31.5 |
| 2013/0249947 A1* | 9/2013 | Reitan | G06T 19/006 345/633 |
| 2016/0049007 A1* | 2/2016 | Mullins | G06F 3/011 345/419 |
| 2016/0335981 A1* | 11/2016 | Koo | G06F 3/012 |
| 2018/0268612 A1 | 9/2018 | Olson et al. | |
| 2019/0011908 A1 | 1/2019 | Liu et al. | |
| 2019/0333260 A1 | 10/2019 | Pedrosa et al. | |
| 2019/0354009 A1 | 11/2019 | Shomin et al. | |

\* cited by examiner

REMOTE CAMERA AUGMENTED REALITY SYSTEM

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from the following provisional patent applications:

U.S. provisional patent application No. 62/639,397 filed Mar. 6, 2018 and entitled "Third Person Perspective Augmented Reality System"; U.S. provisional patent application No. 62/639,398 filed Mar. 6, 2018 and entitled "Remote Augmented Reality Camera for Image Processing and Mapping"; U.S. provisional patent application No. 62/639,400 filed Mar. 6, 2018 and entitled "Augmented Reality Camera Control for Combined Virtual and Augmented Reality Environments"; U.S. provisional patent application No. 62/639,402 filed Mar. 6, 2018 and entitled "Image Detection-Based Progression System"; and U.S. provisional patent application No. 62/639,404 filed Mar. 6, 2018 and entitled "Inertial Measurement System for Virtual Avatar and Real World Interaction"

BACKGROUND

Field

This disclosure relates to augmented reality and more particularly to augmented reality through images provided by a physically distinct device that enable various interactions within augmented reality and virtual reality environments.

Description of the Related Art

There exist various implementations of augmented and virtual reality. For example, various head mounted displays have enabled virtual reality and augmented reality experiences when worn on a user's head and in conjunction with appropriate software. In more recent incarnations, augmented reality experiences or toys have provided systems reliant upon mobile devices (e.g. smart phones) that use their included cameras to film reality and to superimpose objects or characters within that reality. More complex systems like Microsoft® Hololens® enable augmented reality and mixed reality experiences for wearers that provide some or a great deal of interaction with the augmented reality components of those experiences such as voice communication or live video-like feeds for holographic conferences.

In a relatively unrelated field, camera drones have become commercially viable at a consumer level. There exist numerous drones, typically flying quadcopter drones, that include or have mounts for cameras that may film as they go, or film and stream directly to a controller or mobile device. These types of drones are used, for example, in filmmaking, by vacationing individuals, in events like drone racing, and industrial applications for moving or filming in places where individuals cannot reach or see.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

The combination of augmented reality technology with remote camera drones enables several new applications including: gameplay that is reminiscent of traditional video racing games but that involves or takes place substantially within reality: playing of platformer-style games that strongly resemble traditional platformers but that take place within reality: or experiences that enhance or broaden the scope of or otherwise play on the space around a player or user to expand it through augmented reality that is experienced from the perspective of the drone or other AR platform.

The use of augmented reality with a remote camera is novel in that it introduces numerous control and operational issues that must be addressed. For example, one must decide which data is relevant to the augmented reality operation by a remote control (e.g. a mobile device) to enable the creation and accurate representation of augmented reality objects from a remote host (which may also be the same mobile device). With the opportunity to integrate multiple sources of information (e.g. visual data and motion data), the environments may be more effectively mapped initially and monitored during augmented reality operation. The actual camera, provided by the augmented reality drone or other platform, must be controlled, either manually or automatically, to monitor the augmented reality media being superimposed over the reality. To increase immersion, the barrier between augmented reality and reality must be blurred as much as possible through practical as well as software-based advancements.

These and other problems are addressed as described below.

Description of Apparatus

Figure 1:
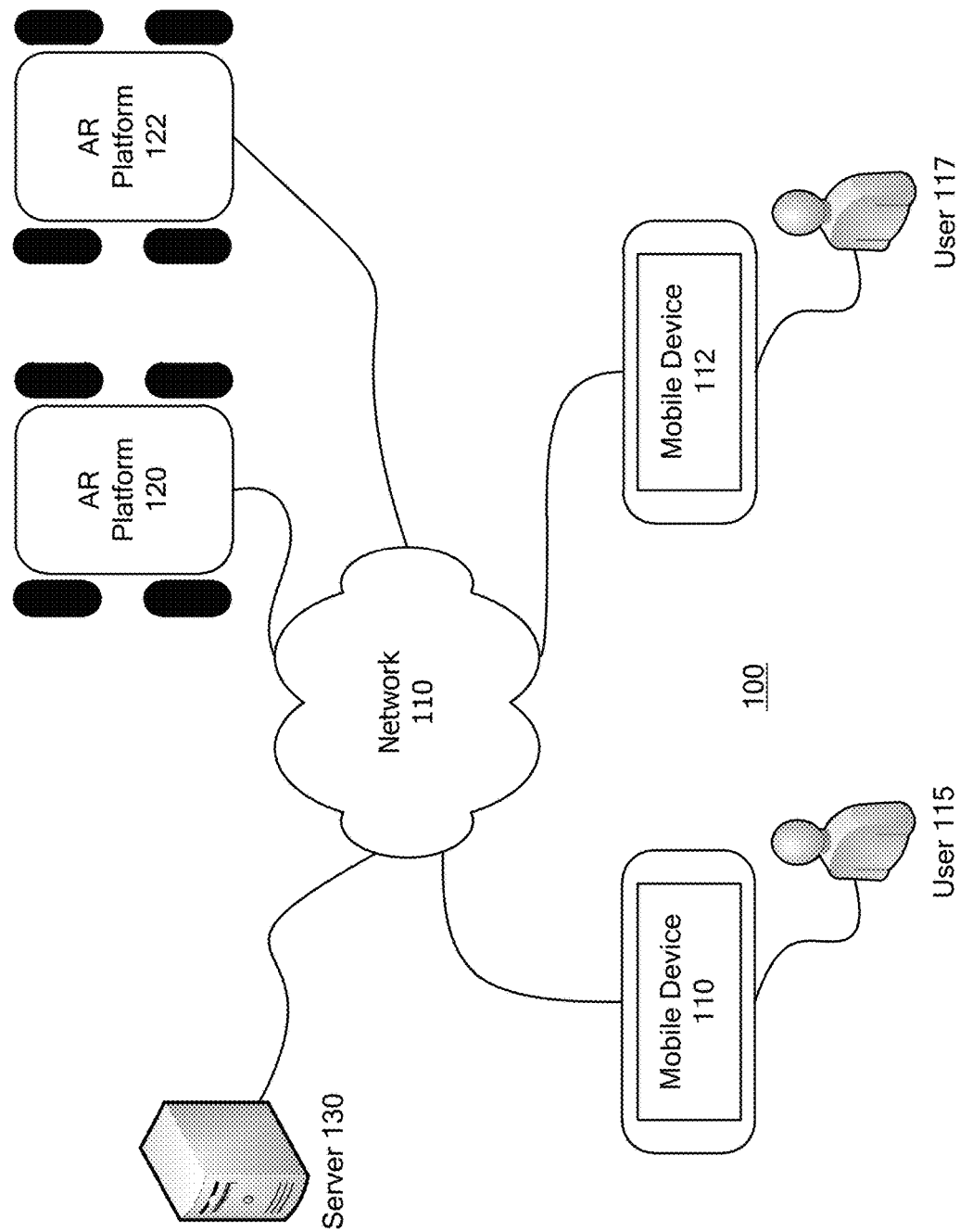
FIG. 1 is an overview of an augmented reality racing system.

Referring now to FIG. 1, an overview of an augmented reality racing system 100 is shown. The system includes a series of mobile devices 110 and 112, AR platforms 120 and 122, and a server 130, all interconnected via a network 110.

Figure 2:
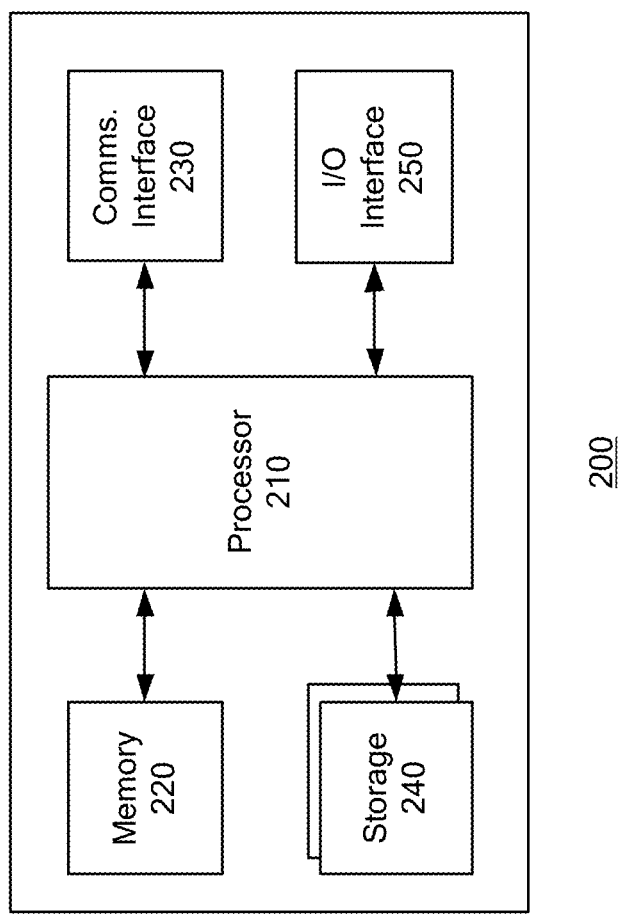
FIG. 2 is a block diagram of an exemplary computing device.

The mobile devices 110 and 112 are computing devices (e.g., as shown in FIG. 2) operated by users 115 and 117. The users 115 and 117 are not a part of the system, but are shown merely to be representative of users operating the mobile devices 110 and 112. Many potential users can participate using associated mobile devices at any time.

The mobile devices 110 and 112 are used to view a display having image data captured and provided to the mobile devices 110 and 112 by the AR platforms 120 and 122. The mobile devices 110 and 112 may also have one or more IMUs (inertial measurement units), communication capabilities, and processing capabilities capable of generated augmented reality or virtual reality environments. The mobile devices 110 and 112 may also incorporate physical controls (e.g. buttons and analog sticks) for receiving control input from the users 115 and 117. Alternatively, on-screen controls (e.g. capacitive or resistive on-display virtual buttons or joysticks) may operate as controls for the AR platforms 120 and 122. The mobile devices 110 and 112 may also have speakers and/or the capability to integrate with headphones to provide sound from associated augmented reality or virtual reality software operating on the mobile devices 110 and 112.

The AR (augmented reality) platforms 120 and 122 are mobile platforms including at least one camera for capturing video image data and transmitting that image data to the mobile devices 110 and 112. The AR platforms 120 and 122 may be "dumb" in the sense that they include none or very limited computing capabilities. Alternatively, the AR platforms 120 and 122 may incorporate a computing device (e.g., as shown in FIG. 2) for performing various operations. The AR platforms 120 and 122 are also capable of being controlled using the mobile devices 110 and 112 based upon control input received from the mobile devices 110 and 112 input by users 115 and 117. The AR platforms, therefore, include at least one camera and potentially include one or more IMUs as well as motors and a locomotive system.

As used herein, locomotive system means a system for moving the AR platform 120 or 122 from one location to another. The locomotive system includes a motor or other motion-generation element and a component that moves in response to the motion-generation element to cause the AR platform 120 or 122 to move from one location to another. Examples of locomotive systems include a motor and one or more wheels which move an AR platform similar to a remote-controlled car, a motor and at least one rotor of an aerial drone which flies about in the air and may be controlled by a remote control or mobile device, a motor and propeller of an AR platform remote-controlled ship or submarine which moves about in water. Other locomotive systems are also envisioned.

The AR platforms 120 and 122 use their respective locomotive systems to move from location to location capturing updated image data and relaying that image data back to mobile devices 110 and 112. The mobile devices 110 and 112 may operate upon that image data to generate augmented reality objects or virtual reality environments and to make a driver (e.g., users 115 and 117) aware of the overall environment of the AR platforms 120 and 122 so that the driver can continue providing control input that may be used to instruct the locomotive systems in continuing to move the AR platforms 120 and 122 from place to place.

The server 130 may or may not be present in all situations. Specifically, the present concepts are envisioned to be used in conjunction with both augmented reality and virtual reality games and other immersive experiences that may be single-player or multiplayer. Multiplayer games and experiences may be "hosted" by one of the participants. However, matchmaking, match tracking, authentication and other capabilities may be handled by the server 130 when multiple users 115 and 117 experiences the associated augmented reality or virtual reality together. In cases in which experiences or games are single-player, the server 130 may or may not be used at all.

The server 130 is shown as a single computer, but may in fact be many computers spread across numerous locations. The server 130 may be one or more virtual servers, operating in the midst of a larger, physical server.

The network 110 is a communications medium for interconnecting the various components of the system 100. The network 110 may be or include the internet, wireless or wired networks, local or wide-area networks, and/or telephone networks. The network's primary purpose is to enable communication between the various components of the system 100 to be shared so that augmented reality or virtual reality experiences or games may take place (e.g., enable image data captured by an AR platform 120 to be transmitted to mobile device 110 and, likewise, to allow control data generated by the mobile device 110 to be transmitted to AR platform 120).

Turning now to FIG. 2, a block diagram of an exemplary computing device 200 is shown. As shown in FIG. 2, the computing device 200 includes a processor 210, memory 220, a communications interface 230, along with storage 240, and an input/output interface 250. Some of these elements may or may not be present, depending on the implementation. Further, although these elements are shown independently of one another, each may, in some cases, be integrated into another.

The processor 210 may be or include one or more microprocessors, microcontrollers, digital signal processors, application specific integrated circuits (ASICs), or a systems-on-a-chip (SOCs). The memory 220 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 220 may store software programs and routines for execution by the processor. These stored software programs may include an operating system software. The operating system may include functions to support the communications interface 230, such as protocol stacks, coding/decoding, compression/decompression, and encryption/decryption. The stored software programs may include an application or "app" to cause the computing device to perform portions of the processes and functions described herein. The word "memory", as used herein, explicitly excludes propagating waveforms and transitory signals.

The communications interface 230 may include one or more wired interfaces (e.g. a universal serial bus (USB), high definition multimedia interface (HDMI)), one or more connectors for storage devices such as hard disk drives, flash drives, or proprietary storage solutions. The communications interface 230 may also include a cellular telephone network interface, a wireless local area network (LAN) interface, and/or a wireless personal area network (PAN) interface. A cellular telephone network interface may use one or more cellular data protocols. A wireless LAN interface may use the WiFi® wireless communication protocol or another wireless local area network protocol. A wireless PAN interface may use a limited-range wireless communication protocol such as Bluetooth®, Wi-Fi®, ZigBee®, or some other public or proprietary wireless personal area network protocol. The cellular telephone network interface and/or the wireless LAN interface may be used to communicate with devices external to the computing device 200.

The communications interface 230 may include radio-frequency circuits, analog circuits, digital circuits, one or more antennas, and other hardware, firmware, and software necessary for communicating with external devices. The communications interface 230 may include one or more specialized processors to perform functions such as coding/decoding, compression/decompression, and encryption/decryption as necessary for communicating with external devices using selected communications protocols. The communications interface 230 may rely on the processor 210 to perform some or all of these function in whole or in part.

Storage 240 may be or include non-volatile memory such as hard disk drives, flash memory devices designed for long-term storage, writable media, and proprietary storage media, such as media designed for long-term storage of data. The word "storage", as used herein, explicitly excludes propagating waveforms and transitory signals.

The input/output interface 250, may include a display and one or more input devices such as a touch screen, keypad, keyboard, stylus or other input devices.

Figure 3:
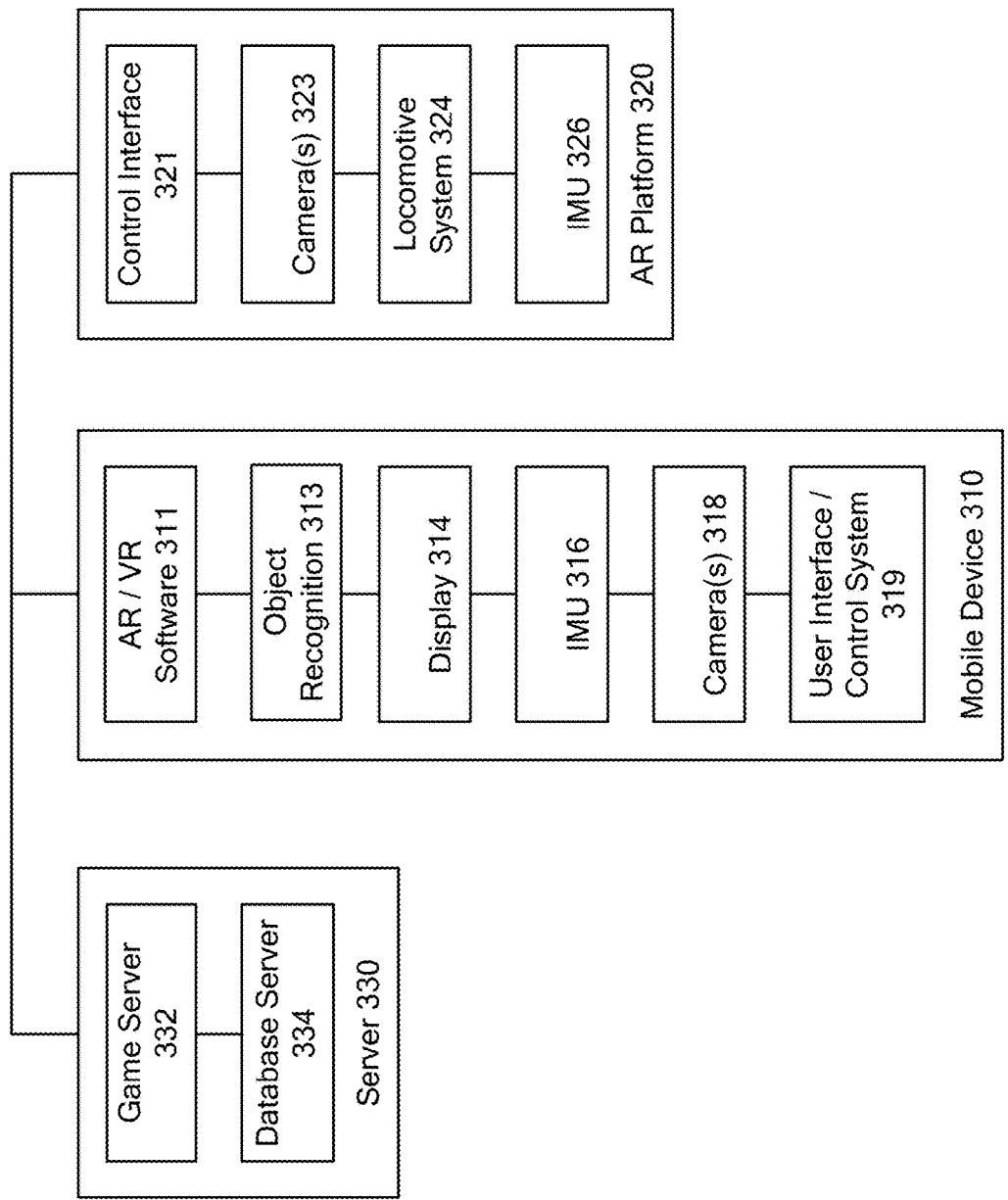
FIG. 3 is a functional block diagram of an augmented reality racing system.

FIG. 3 is a functional block diagram of an augmented reality racing system. The functional block diagram includes a mobile device 310, an AR platform 320, and a server 330, which may be the mobile device 110, the AR platform 120 and the server 130 of FIG. 1. There may be many mobile devices, like mobile device 310, and many AR platforms, like AR platform 320. However, since their functions will largely be the same, only the individual mobile device 310 and AR platform 320 are shown. In addition, underlying components that are not particularly relevant to this discussion are omitted such as operating system software, communications stacks and protocols, and network routers and connections.

The mobile device 310 may be a traditional mobile phone or smart phone. The mobile device 310 may be a tablet computer or laptop computer. The mobile device 310 may be a handheld gaming platform. Though described as a "mobile device" the device 310 may be fixed as a traditional computer or traditional gaming console. Virtually any computing device of sufficient processing power and suitable inputs may operate as the mobile device 310. Though it may be preferable for the mobile device 310 to be movable, it is not required.

The mobile device 310 includes AR/VR software 311, object recognition software 313, a display 314, an IMU (inertial measurement unit) 316, one or more camera(s) 318 and a user interface/control system 319. Some of these elements, for example, the object recognition software 313 and IMU 316, may be optional and may or may not be included in the mobile device 310.

The AR/VR software 311 is software for generating augmented reality or virtual reality environments. The distinction between AR (augmented reality) and VR (virtual reality) that is relevant for this disclosure is that AR incorporates some element of reality whereas VR is an entirely computer-generated experience. AR may, for example, be a video view of the real world through a camera, recreated on a display, with alterations to that video. The alterations may be as simple as filters (e.g. the addition of large eyes, or an unusual hat, or sparkles hovering near a person's head) when the video is seen. The additions are computer generated using AR/VR software 311, and the remainder of the image is captured by the camera(s) 318 and reproduced substantially as it appears in reality.

As used herein, the phrase "augmented reality media" means computer-generated content that is or may be overlaid onto images of reality (e.g. digital video) to superimpose that content into those images as if it were present in reality. Augmented reality media could include signs, characters, vehicles, toys, plants, partial environments, and virtually any other computer-generated images that may be superimposed over images of reality.

Other augmented reality elements may be characters with whom an individual can interact (e.g. speak with or shake hands with or sit near), real individuals that are being projected into a place in an image of reality (this is often called "mixed reality"), a location, a sign, vehicles, components of vehicles or other objects, or other aspects that are not present in reality but that are generated by the AR/VR software 311.

Virtual reality is an environment into which one may "look" or with which a user may interact that is entirely computer-generated. These types of environments often rely upon so-called "game engines" because game engines are particularly good and quick (when coupled with the right hardware) at generating believable three-dimensional locations. Virtual reality is typically associated with some form of headwear (e.g. a head-mounted display) which wholly covers the entire field of vision of a wearer. Then, a wearer's head is "tracked" as he or she turns or moves about in a space, and the virtual reality environment is updated to reflect that. However, virtual reality need not require a head worn display. In some cases, the display device (e.g., a mobile device) may act as a "portal" into the virtual world through which a user may look. Instead of tracking the user's head, movement of the display device may be tracked to update the direction within the virtual environment that an associated virtual camera is looking. The images of the virtual reality environment on the display device may be updated accordingly.

The AR/VR software 311 is software that generates augmented reality and/or virtual reality, depending on the particular implementation. That AR/VR software 311 may rely upon several inputs. Those inputs may include IMU data (e.g., positional, locational, and orientational data), camera images (e.g., RGB images or associated video captured by a digital camera), infrared or LIDAR images (e.g., spatial images having depth or approximating depth) so that the software 311 can have an understanding of the spatial area in which it is operating, and control input data which may be external control of the location of the associated cameras and IMUs (e.g., on the AR platform 320, as discussed below). The AR/VR software 311 may rely upon information captured by the elements of the AR platform 320 to generate augmented reality objects or a virtual reality environment.

The object recognition software 313 may be a part of the AR/VR software 311 or may be separately implemented. Object recognition software 313 may rely upon camera data or specialized cameras (such as infrared and LIDAR) to perform object recognition to identify objects within images of an environment. In the most basic version of the object recognition software 313, the software operates to identify barcodes, QR codes or other machine-readable elements. Those codes may be used to mark relevant portions of reality or other objects (e.g., other AR platforms 320) in reality. This will be discussed more fully below.

In a more complex variation, the object recognition software 313 may operate using trained neural networks to identify specific objects or object types in substantially real-time. Object recognition software 313 may be able to match the same object each time it passes by or each time it is detected in image data from a camera, or to identify the same three-dimensional shapes or set of shapes each time they pass using specialized cameras. The object recognition software 313 may rely upon both traditional images and specialized images including depth information to perform object recognition.

The display 314 is a computer display of sufficient size and quality for display of image data captured by the camera(s) 318 (or, more likely, the camera(s) 323). The display 314 may be capacitive or resistive, and may incorporate software controls or readouts of relevant information about the mobile device 310 or AR platform 320. The display is capable of real-time or nearly real-time display of image data transmitted to the mobile device 310 from the AR platform 320 and of overlay of augmented reality (or full replacement with virtual reality) of image data as directed by the AR/VR software 311 without significant slowing of frame rates of the display (approximately less than 60 ms delay).

The IMU 316 is an inertial measurement unit. The IMU 316 may not be necessary in the mobile device 310, but may be used, for example, as a part of a control scheme. For example, in a driving or flying augmented reality game, movement of the mobile device 310 may translate into steering. Movement or orientation of the mobile device 310 in certain directions within a virtual reality environment may instruct an on-screen avatar to move forward, backward, jump, or the like.

The camera(s) 318 likewise may not be required in the mobile device 310. However, if present, camera(s) 318 may provide a secondary source of information for the object recognition software 313. The mobile device 310 is typically held at a waist height or in front of a user's eyes. So, it may offer a different (e.g., higher or lower) vantage point to enable object recognition to operate more efficiently. The camera(s) 318 may also enable tracking of the AR platform 320, either approximately or accurately, from a vantage point outside of the AR platform 320 itself. The camera(s) 318 may be traditional digital video cameras, but may also include infrared, LIDAR or other depth-sensing cameras.

The user interface/control system 319 is used to control the locomotive system 324 of the AR platform 320. The user interface/control system 319 may be or include the IMU 316, as discussed above. However, the user interface/control system 319 may be a more traditional controller or controller-style system including a series of buttons and control sticks or a keyboard and/or mouse. The user interface/control system 319 may also include software-based controllers such as on-screen buttons and movement systems that are shown on the display 314.

The AR platform 320 is a mobile and remote augmented reality device incorporating at least one camera. It is an "AR" platform in the sense that it captures video and/or IMU data that is used to generate an augmented reality by the AR/VR software 311 in the mobile device 310. Unlike typical augmented reality systems, the camera(s) 323 used for that augmented reality are remote, operating upon the physically separate AR platform 320, rather than on the mobile device 310. Examples of AR platforms 320 include remote-controlled cars, remote-controlled airplanes, helicopters and drones, and remote-controlled ships and submarines. Other examples are possible.

The AR platform 320 includes a control interface 321, one or more camera(s) 323, a locomotive system 324 and an IMU 326. Other elements may be present in some cases.

The control interface 321 is for receiving instructions from the mobile device 310 (e.g. the user interface/control system 319) and passing those along to the locomotive system 324 to cause the AR platform 320 to move as directed by the mobile device 310.

The camera(s) 323 are cameras attached to the AR platform 320 to capture image data to be transmitted to the mobile device 310 and so that a user of the mobile device 310 may see and control the movements of the AR platform 320. The camera(s) 323 may be traditional digital video cameras, but may also include infrared, LIDAR or other depth-sensing cameras.

The locomotive system 324 is discussed above. The locomotive system 324 is how the AR platform 320 moves from location to location. The locomotive system may be a set of wheels and a motor for a remote-controlled car-like AR platform 320. The locomotive system 324 may operate on a rail system in some cases or may be a helicopter or drone.

The IMU 326 is one or more inertial measurement units to generate motion, positional, and orientational data for the AR platform 320. The data generated by the IMU 326 may be passed to the AR/VR software 311 to update augmented reality object(s) or virtual reality environment in which the AR platform 320 is operating.

The server 330 includes a game server 332 and a database server 334. Numerous other elements may be present in different situations, but these two general components are present in most implementations that rely upon or use a server like server 330. As indicated above, the server 330 itself may be optional. To the extent a server 330 is used at all, it may have these components.

The game server 332 is software for matching players with one another, for performing authentication to enable players or users to access the server, for operating or maintaining an augmented reality or virtual reality in synchronicity between multiple participants in the augmented or virtual reality so that the same augmented reality objects are seen by all participants, and for tracking progress or position within the augmented reality or virtual reality environment. If there are win conditions or other conditions, the game server 332 may track those as well. It is called a "game server" primarily because the AR/VR software 311 typically operates from a basis of a game engine. So, the game server 332 is likewise traditionally used for and with games. The game server 332 may also generate statistics or other information about the augmented reality or virtual reality it is serving to participants. The game server may store a copy of the augmented reality or virtual reality components and may enable the AR/VR software 311 to be updated or maintained.

The database server 334 is to store authentication credentials, statistics or other information about participants in the augmented reality or virtual reality, and any other database information required to operate augmented reality and virtual reality environments including multiple participants.

Description of Processes

Figure 4:
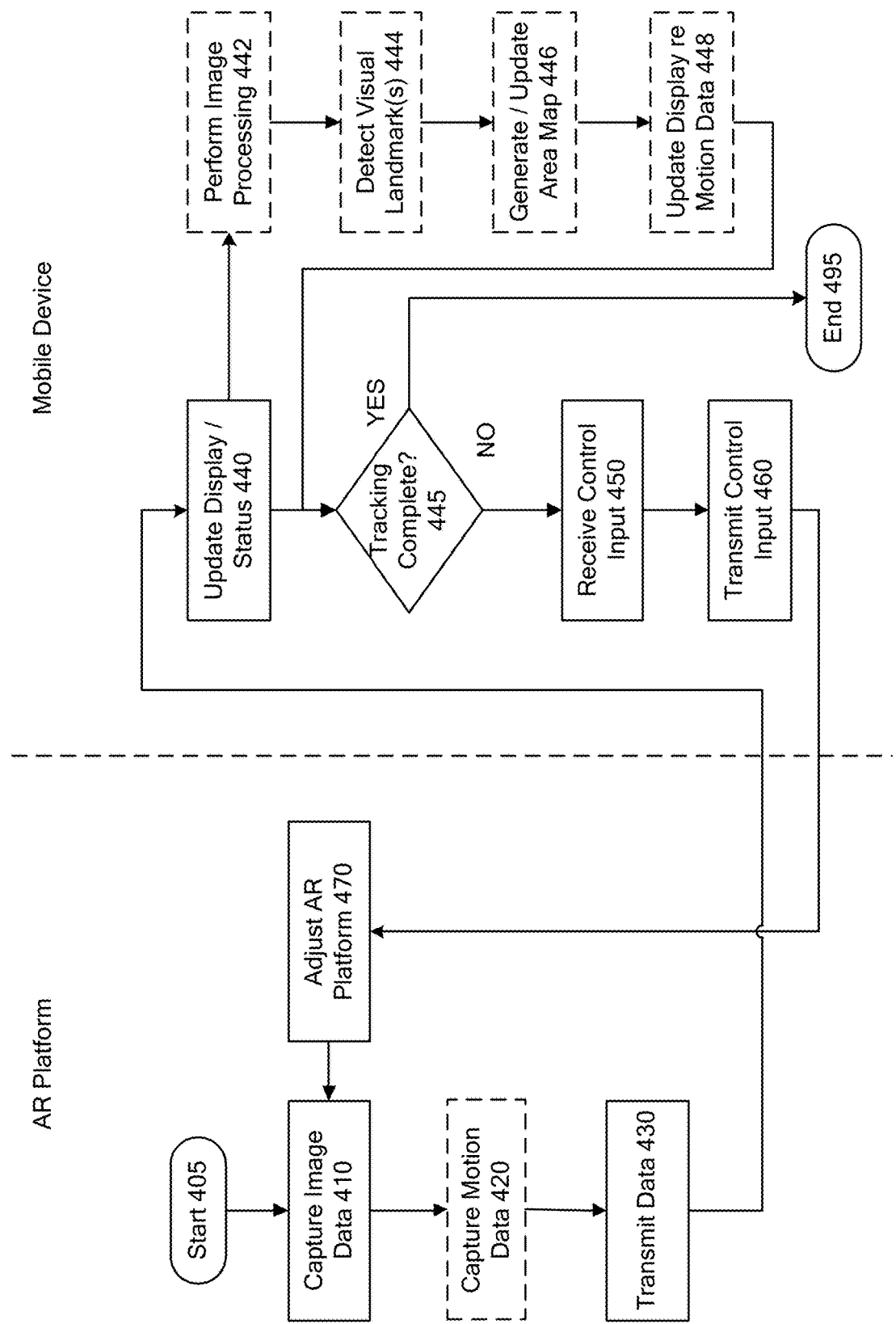
FIG. 4 is a flowchart of remote camera augmented reality and race progression tracking.

Referring now to FIG. 4, a flowchart of remote camera augmented reality and race progression tracking is shown. The flow chart has both a start 405 and an end 495, but the process may take place many times or many times for different AR platforms 320 (FIG. 3) at a time or at different times. In general, the processes on the left take place on an AR platform, while the process on the right take place on an associated mobile device. Though, in some cases, some of the processes may take place, at least in part, on an AR platform or the mobile device or both.

Following the start 405, the process begins with the capture of image data 410. As used herein "image data" means traditional digital video image data. However, image data may also include depth data (e.g. data captured by infrared, sonically, or through other methods) to create an "image" of the surroundings. The image data is captured by the camera(s) 323 on the AR platform 320. As indicated above, image data may also be captured in some cases by the mobile device 310 camera(s) 318, but this is not required.

This image data is captured at 410 on a substantially continuous basis. For example, as the AR platform 320 (FIG. 3) moves from place to place, the image data changes because the camera(s) 323 capture new image data from that new location. Preferably, that image data is streamed or otherwise transmitted to the mobile device 310 (FIG. 3) as quickly as possible. Dropped frames of video or partially dropped frames may simply be ignored, with later frames taking their place, because it is much more important to continue providing a substantially live view from the camera(s) 323 than to make sure every frame is properly included. Image data is captured using at least one AR platform 320 camera(s) 323, but may also rely upon or be integrated with image data from other AR platforms 320 operating in the same real world environment or virtual environment.

Next, motion data may be captured at 420. This is shown as an optional step because it may not be present in all implementations, but it is possible to incorporate the motion data for other purposes discussed below. Motion data is generally data generated by the IMU 316 that includes data that may be used to estimate speed, estimate motion like turning or movement vertically relative to gravity, and detect events such as flipping over, being hit, running into things, and the like. All of the foregoing may be captured by the IMU 316 for the AR platform 320. As with image data, the motion data is captured using at least one IMU 316 on one AR platform 320, but multiple AR platforms 320 may capture motion data.

Next, the image data and motion data (if captured) may be transmitted at 430 to the mobile device. As indicated above, this happens as quickly as possible and may effectively be "streamed" from the AR platform 320 to the mobile device 310. That image data and motion data may come from multiple AR platforms 320 or only from one.

The AR/VR software 311 may update the display/status at 440. When image data is first streamed to the mobile device 310, this update the display/status at 440 may merely be showing the associated captured image data on the display 314 of the mobile device 310. Thereafter, the update the display/status 440 may involve updating the image to show the most recently-captured image data.

In addition, the AR/VR software 311 may incorporate one or more augmented reality or virtual reality elements in response to the image data (and motion data) onto the display 314 when it is updated at 440. These updates may be to show augmented reality objects at a new or updated location, to re-center or re-render a virtual reality environment, or to show responses to the status or image data. For example, if an augmented reality racing game is taking place, augmented reality road signs may be updated to show a leader board with positions of the various participants in the race. If a lap-marker was just passed, it may be noted on the display by an augmented reality banner or in an augmented reality character reaction. If a character is in the midst of being controlled by a mobile device 310, then the character may be updated to reflect the controls being provided to that character.

So, for example, a virtual character or virtual racing machine (e.g. cart, plane, etc.) may be superimposed over an actual image. The superimposition may be whole (e.g. fully blocking any view of the AR platform 320) or partial (only blocking some of the AR platform while showing other portions). The augmented reality characters or objects overlaid on top of the actual image data may react to the image data and/or motion data. For example, if the AR platform 320 is moving quickly in a racing game, an associated character may respond by acting or being animated such that he or she appears to be windblown or otherwise concerned about the speed of the AR platform 320. Afterburners may fire up on an augmented reality plane. An augmented reality crowd may react to movement of or other information about the real-world AR platform 320. Other updates to the display/status at 440 may take place.

Several optional operations are shown here in elements 442 through 448. These operations may or may not take place in various implementations.

The first of these optional operations is to perform image processing at 442 of the captured image data. This image processing may be performed by object recognition 313 and/or AR/VR software 311. The image processing may be simple, such as selecting a frame or a series of frames and analyzing them to identify machine-readable elements. This process may be complex, such as spatial recognition, reliant upon image-only data or image and depth data, to generate a map of the physical area surrounding the AR platform 320 as it moves.

Depth data, in particular, whether it is estimated using images (e.g. stereography) or actual using depth sensors like infrared or LIDAR may be helpful in the image processing. The image processing at 442 may enable the mobile device 310 to construct a relatively detailed understanding of the three-dimensional environment in which the AR platform 320 is operating at any given moment. That may be used for numerous purposes, some of which are discussed herein.

The first of those purposes is to detect visual landmark(s) at 444. As used herein, a visual landmark is an aspect of the physical world that is detectable by the mobile device 310 using at least image data captured by the camera(s) 318 on the AR platform 320 and usable by the mobile device 310 to identify the AR platform 320's relative location within a three-dimensional space. Examples of visual landmarks include QR codes, barcodes, particular colored objects, particular shaped objects, and the detection and identification of repeats of the same object (e.g. the same chair has been passed three times). The subset of visual landmarks that are generated specifically for computer detection, such as QR codes, barcodes, particular colors or shapes of objects, particular light configurations or colors, and similar elements are "machine-readable elements".

The visual landmark(s) enable the system to function at least somewhat independently to operate as a game, and enable the system to generate and update its own area map 446. As an AR platform 320 or multiple AR platforms move about in a physical space, they are continuously capturing image data about that space. Over the course of several turns about that space, potentially laps or flights throughout around that space, the AR platforms generate sufficient image data to inform object recognition 313 of the three-dimensional and visual contents of that space.

As a result, the mobile device 310 may generate/update an area map 446 showing the general layout and makeup of the area. That map may be simple, and top-down showing objects overlaid with their images that are captured from within the image data or may be three-dimensional and may even be so complex as to operate as a virtual reality map or to be able to be replaced with a virtual reality environment into which others may then interact.

For example, the virtual reality map may be a map of a living room in which a series of flying drones are operating in a race. After three laps, with three drones, the resulting three-dimensional map created during that process and associated image processing may generate a map that is sufficiently detailed that, later, a virtual drone may be flown within that same space, now recreated in virtual reality. The same controls may operate in both spaces (e.g. controls to control the physical drones may be co-opted later to control the virtual drone in the virtual reality environment of that virtual reality map).

In a more basic example, after several laps around a space using remote-controlled AR platform 320, the layout and general physical components surrounding a race area may be sufficiently known such that a top-down view of a "map" of the race location may be generated and displayed on each participant in a racer's display 314 on their associated mobile device 310.

At the same time, this updating the area map 446 and updated display/status may also track progression within an environment. The detected visual landmarks may be used, for example, for tracking positions within a race and race completion or other victory conditions. As an AR platform 320 or group of AR platforms move about a space, relative location and/or progression may be tracked and updated at 440 to determine progression within the competition. The visual landmarks may provide guideposts as they are approached or crossed that inform the overall system that various conditions for the AR platform 320 are being met.

The final optional update to the display/status 440 is to update the display regarding motion data at 448. In cases in which motion data is captured at 420, that data may further inform the characters, augmented reality objects or any virtual reality environment. For example, motion data indicating a very tight turn for the AR platform 320 may cause an augmented reality character sitting in or on the AR platform 320 (digitally, not actually) to appear to hang on for dear life or to nearly fall out of the AR platform 320. The AR platform 320 crashing into something (as detected by the IMU 316 may cause the AR object such as an AR overlay car to appear wrecked or crashed or smashed, or a character riding in or on the car may fly out and climb back in while appearing dizzy.

An IMU 316 may detect inversion of an AR platform 320 or that a flying AR platform 320 has likely crashed. An on-screen augmented reality avatar may encourage a user to flip the AR platform 320 back over or may animate a fiery crash. This data may include flips, rollovers, inversions, bumps, crashes, reversing, bouncing, and various other types of motion data. Augmented reality or virtual reality may be updated to reflect any of that motion data.

This may be further integrated with IMU data from multiple AR platforms 320 being integrated. For example, if two AR platforms 320 both detect side-hits, one on its left side, the other on its right side at substantially the same time, then the display 314 of the mobile devices 310 associated with each AR platform 320 may be updated to indicate that the two AR platforms 320 bumped into one another. Augmented reality characters or objects may be updated accordingly to reflect dings or have characters animate annoyance. In this way, motion data from multiple sources may be combined to inform augmented reality or virtual reality.

The process then determines whether tracking is complete at 445. If the tracking is complete such as when the race is over, the game is over, or the character dies or fails ("yes" at 445), then the process may end at 495.

If tracking is not complete ("no" at 445), then control input from the mobile device 310 may be received at 450 by the AR platform 320. These controls may direct an on-screen character, movement of the AR platform 320 itself, or some combination of both. The controls may operate to cause the AR platform 320 to move while not moving the character or the augmented or virtual reality (e.g. adjusting the real-world camera for an augmented reality player character or other object).

Those control inputs may be transmitted at 460 to the AR platform 320. The control inputs may direct the movement of the AR platform 320 so that it turns, moves vertically, beeps a horn, or otherwise changes its movement or location.

The AR platform 320 is adjusted at 470 in accordance with the control inputs provided at 460. As a result, the image data changes and is captured anew at 410 and the process continues until tracking is complete at 445.

Figure 5:
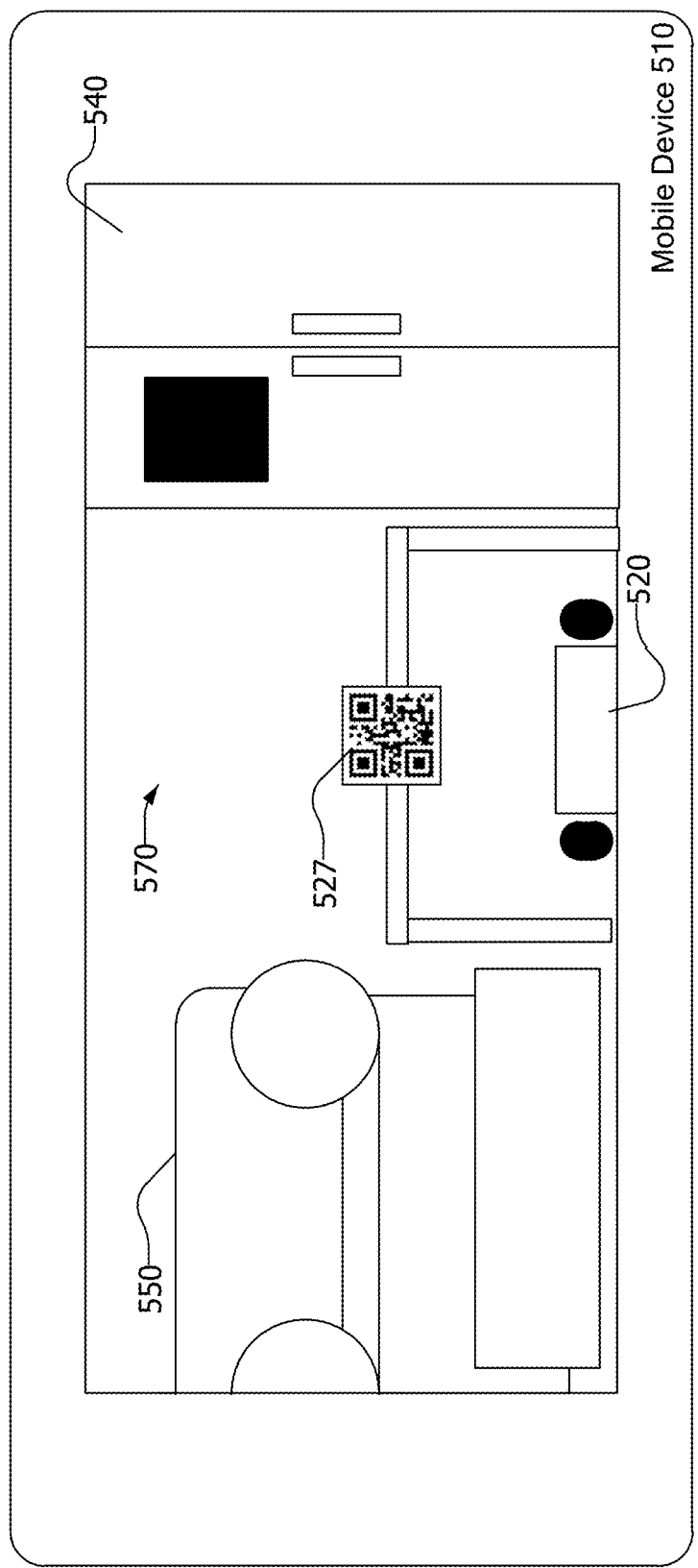
FIG. 5 is an example display screen of a mobile device showing remote camera capture and race progression tracking.

FIG. 5 is an example display screen of a mobile device 510 showing remote camera capture and race progression tracking. A real-world living room 570 is shown, near a kitchen from the perspective of an AR platform 520. The living room includes a chair 550 and a refrigerator 540.

The AR platform 520 here may be a wheel-driven go-cart style remote controlled car. The AR platform 520 has a camera on its top. However, the camera is not shown because the image seen on the display is created by the camera mounted on the AR platform 520. A portion of the AR platform 520 (e.g. the front of the car) is just visible along with the wheels.

The camera of the AR platform 520 here sees a visual landmark 527 mounted atop a physical gate that may be placed within the world. The gate, if used, may be a half circle or ring with distinctive markings, or stickers, or shape; that can be used to operate as a series of checkpoints through which the AR platforms may pass through during the course of a race or route which may be defined by those gates (e.g. goals to reach three laps, or to traverse through each gate in an particular order). The visual landmark 527 in this case is a QR code. QR codes are typically black and white, easily recognizable and readable with relatively simple computer vision techniques, and may function to act as "gateways" or checkpoints in a racing game or in a traversal game throughout a real-world environment. However, other visual landmarks, as discussed above, may be used instead of, in addition to, or in place of the QR code.

In some cases, visual landmarks will be generated by the object recognition software 313 such that no placed visual landmarks are necessary at all. In those cases, the relative location of, for example, the refrigerator, will be noted as the AR platform traverses the living room 570 during a race or traversal. When the AR platform 520 is back to the place where it began or has reached a location designated based upon object recognition, the objective may have been reached without the use of any QR code or similar visual landmark.

Figure 6:
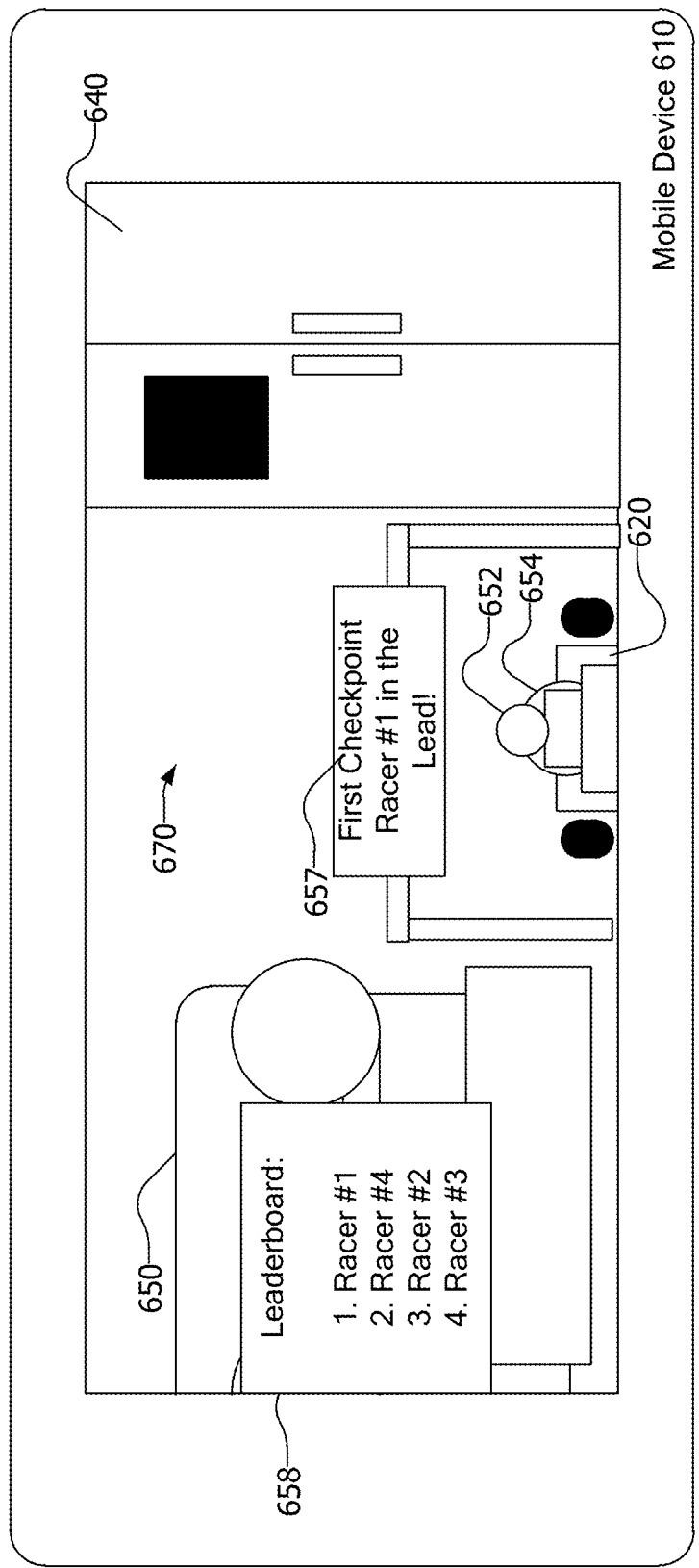
FIG. 6 is an example display screen of a mobile device showing remote camera augmented reality and race progression tracking.

FIG. 6 is an example display screen of a mobile device 610 showing remote camera augmented reality and race progression tracking. The same living room 670 is visible with the same chair 650 and refrigerator 640, but now augmented reality objects are superimposed over some of the physical objects within the room.

First, the AR platform 620 is visible, but a character 652 and steering wheel 654 are superimposed over the AR platform 620. This can be done in such a way that the character appears to be sitting in an augmented reality seat or cockpit. As the image data and motion data are updated, the character 652 and steering wheel 654 may be animated such that they operate in conjunction with the input controls received from the mobile device 610 so that they appear to "steer" or otherwise operate the AR platform 620. The animation may be designed such that the augmented reality and real AR platform 620 appear to integrate as tightly as possible while under the control of the mobile device 610.

In addition, the visual landmark 527 is now replaced with an augmented reality overlay 657 identifying the first checkpoint and providing information about an ongoing racing competition. This overlay 657 is only an example. Overlays may be placed anywhere and may provide information or may merely be decorative or aesthetic. The overlay 657 can conveniently "hide" the visual landmark 527 of FIG. 5 (shown as a QR code) from the user and pass along information to the augmented reality driver. To the extent that visual landmarks are based upon image processing, similar overlays to overlay 657 may be placed in locations that make sense for the particular type of augmented reality experience (e.g. flat places or simply floating about marked locations like lap markers or checkpoints).

Finally, a leaderboard 658 is displayed as an augmented reality overlay that may float near the AR platform 620 or that may be fixed in place relative to the edge of the screen.

Figure 7:
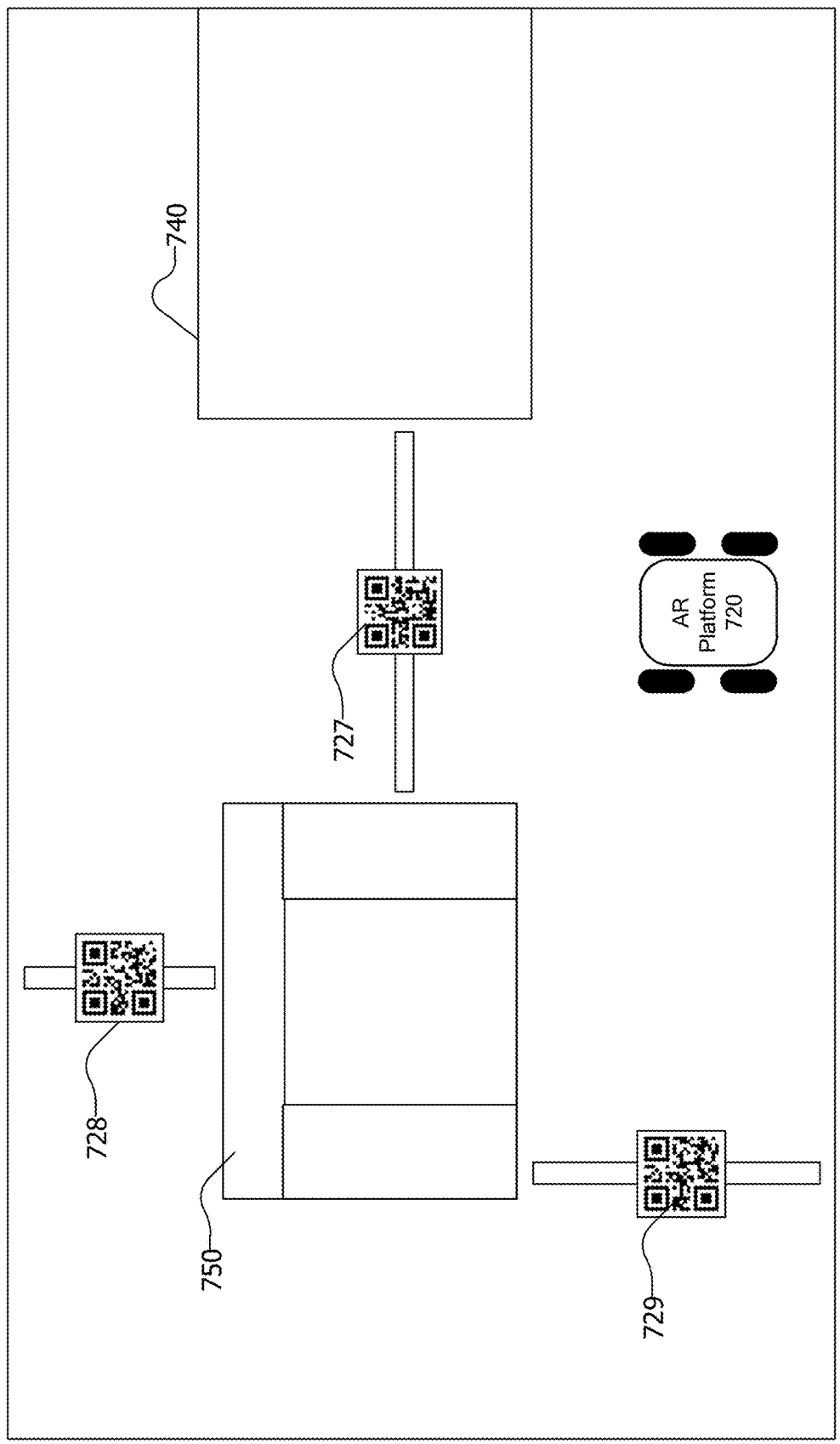
FIG. 7 is an overview of a sample race progression tracked using race progression tracking.

FIG. 7 is an overview of a sample race progression tracked using race progression tracking. This is intended to be a top-down perspective of an augmented reality race that may be the race of FIGS. 5 and 6. Here, we see the AR platform 720 in approximately the same position as in FIGS. 5 and 6, with visual landmark 727 in the same location between the chair 750 and refrigerator 740. We see two other visual landmarks 728 and 729 which may be used to track progression through an augmented reality environment through a series of laps or other traversal. The camera(s) on the AR platform 720 may transmit image data to a mobile device 310 that detects the visual landmarks and identifies a relative location of the AR platform 720.

Though the examples of FIGS. 5-7 are provided with respect to a racing game incorporating augmented reality elements (e.g. the AR racer character, steering wheel, lap counters, and checkpoint notifications) other options are envisioned for use with the same overall systems. For example, the detected physical characteristics of a location may be converted into a virtual reality environment with ongoing image data wholly (or only partially) replaced with a computer-generated virtual reality environment. Then, a character may traverse that space while followed by the AR platform 720 acting as a "camera" for the augmented reality character. This is described more fully below.

Likewise, the race or course could take place in the air using a flying AR platform 720. Games and experiences other than racing are also envisioned. Augmented reality characters or animals may be generated by a mobile device. The user may use a mobile device to guide the AR platform 720 through the characters or animals as an augmented reality "tractor" to tend to a farm or following an augmented reality character as it tends to his or her augmented reality sheep within a physical space in a manner similar to Harvest Moon® type games, but taking place in a player's living room or kitchen. The AR platform 720 may, in such cases, be a flying drone or a wheel-based drone that is, itself, augmented with a front-end loader or plow in the associated visual images created by the mobile device or may follow an augmented reality character or vehicle around within a real, physical space that has been augmented to incorporate animals and plants. An augmented reality pet may live in a space, closely followed by the AR platform 720 as the pet plays in the real-world space. A "pen" may be set up using visual landmarks to keep the pet within a space.

The system may integrate virtual characters or objects and real objects such that a platformer type game may take place with an augmented reality character traversing a physical real-world space while followed by the AR platform 720. In such cases, the physical layout of the space should be detected to enable the platformer style game to take place. The AR platform 720 must be controlled so as to intelligently move about the space and follow the augmented reality character. This example is discussed more fully below. These examples and others are envisioned.

The relevant aspect of each of these examples is that an AR platform 720 is capable of moving about a space and integrating augmented reality objects, characters, or elements within that space to enable augmented reality interactions that do not rely upon a user-worn head mounted display or a user holding an AR viewing screen in their hands while moving the physically connected hand-held camera about a space. Instead, the user controls a stand-alone, separate AR platform 720 that moves about a space and provides the perspective from which image data is received, and upon that image data the augmented reality is superimposed.

Figure 8:
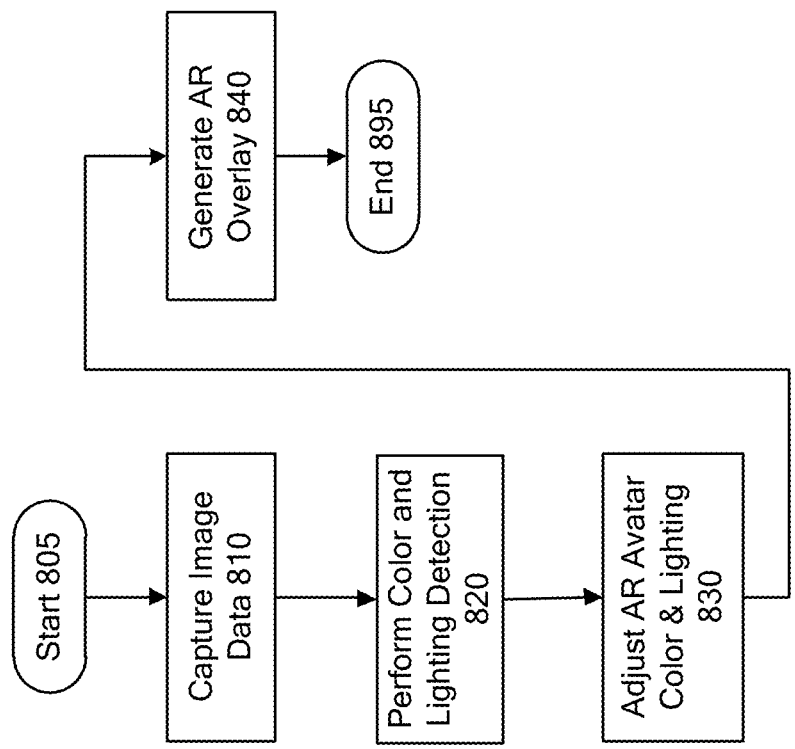
FIG. 8 is a flowchart of adjustment of color and lighting for augmented reality objects to correspond to real world objects.

FIG. 8 is a flowchart of adjustment of color and lighting for augmented reality objects to correspond to real world objects. The process begins at start 805 and ends at end 895, but can take place cyclically or repeatedly as lighting and other elements change or update while the AR system functions.

After the start at 805, the image data is captured at 810. As discussed above, this is preferably image data captured from the AR platform 320 (FIG. 3). The camera(s) 323 of the AR platform 320 may be arranged such that generated image data may incorporate at least a portion of one or more physical objects within the frame of the image data. Those physical objects may have known characteristics, such as shapes and colors. In particular, an actual pantone color may be known or may be known to be in a particular color range.

As envisioned for at least one of the applications of this technology, a racing game includes a physical AR platform 320 that mounts camera(s) 323 so that a portion of the AR platform 320 is visible. This may appear as a "hood" or front of a vehicle, as if it were an actual race car. Alternatively, if the application is a flight simulation, a front-end of a plane may be physically present on the AR platform 320, but lacking an expected propeller. The hood of the front of a vehicle may be non-descript, essentially a single color.

The image data received from the AR platform 320 may be analyzed by object recognition 313 to perform color and lighting detection at 820. The color detection compares the known color or color range expected for the visible portion of the physical object within the image data. The lighting detection may indicate that lighting appears to be coming from a particular direction or applying a shadow in a certain direction, or that there is a reflection in a certain direction and with a certain color. As a result of the lighting or other ambient characteristics of the environment in which the physical AR platform 320 is operating, the color of the physical AR platform 320 may appear differently than a generic pantone color or color range.

As discussed above, an augmented reality character, or other aspects of the AR platform 320 that are not physical may be superimposed over the image data to increase immersion for users. For example, characters may react to control inputs instructing the character to "turn" a remote-controlled AR platform 320. Also, a steering wheel and seat for the AR platform 320 that are not physically present may be superimposed over the physical AR platform 320 within the image data by the AR/VR software 311 to make it appear as though the AR platform 320 has a character sitting on it or within it driving the AR platform 320. A cockpit for a plane or a race car may be superimposed.

Those characters and augmented reality objects that are intended to make up a portion of the AR platform 320 should match as closely as possible to the actual color of the physical portion of the AR platform that is visible on the display 314. Otherwise, the character, cockpit, seat, steering wheel, and the like will appear out of place or disconnected from the AR platform 320 and this will make the experience less-pleasant for a user or player. For the airplane with no propeller example above, propeller animation may have a particular reflection superimposed over that propeller (e.g. light from a particular angle) to make it appear color and lighting correct.

Therefore, following color and lighting detection at 820, the AR avatar (e.g. a character and any other augmented reality objects) are adjusted at 830 to better match the color and lighting of the physical AR platform 320 portion visible on the display 314 based upon the image data. This may take place in substantially real-time on an ongoing basis as lighting and directionality of the lighting (e.g. shadow casting, reflections, etc.) change as the AR platform 320 moves about a physical space.

This may involve creating a virtual shadow, providing a reflection that mirrors or matches one shown on the front of the AR platform 320 or darkening, lightening, or providing adjustments to the color warmth or tone of the AR avatar, characters, objects, and the like while the AR platform 320 is moving about.

The augmented reality overlay is then generated at 840 to correspond to the detected colors and lighting. The same process may begin again for the next frame of video or the process may take place only every few frames to save on processing power. The process is shown ending at 895, but the process may repeat for each frame of video from the image data to ensure that the augmented reality objects, overlays, characters, and the like correspond to the actual lighting and color tones within the space the AR platform 320 is operating.

Color correction can be relatively straightforward and may be accomplished by simply taking a sampling of the average color of the visible portion of the AR platform 320 and adjusting the color of any associated AR overlay such that its average color matches that in the image data for the AR platform 320. This may be an increase or decrease in one or more of the red, green, blue (RGB) components of a given color that may be applied equally to each pixel to reach the appropriate color range. In more complex systems, transitions from overlay to physical objects (e.g. the borders between physical objects and AR objects) may be handled on a pixel-by-pixel basis to "smooth" any transitions between the two from a color perspective.

Lighting systems are also known in the space. Directional lighting using shaders has been known for some time in game engine technology. More recently, ray tracing has added the capability for game engine lighting to act in a manner quite similar to actual lighting (e.g. casting light where it would naturally fall based upon a "ray" and casting shadows where it would naturally fall based upon another "ray"). Projecting this backwards to estimate lighting source locations relative to AR objects may be a bit more complex. The best systems rely upon machine learning to determine light source location based upon training from many hundreds or thousands of images with correct relative light source locations identified. Once sources are identified, even roughly, shaders or ray tracing may be used to project appropriate lighting on augmented reality objects.

Figure 9:
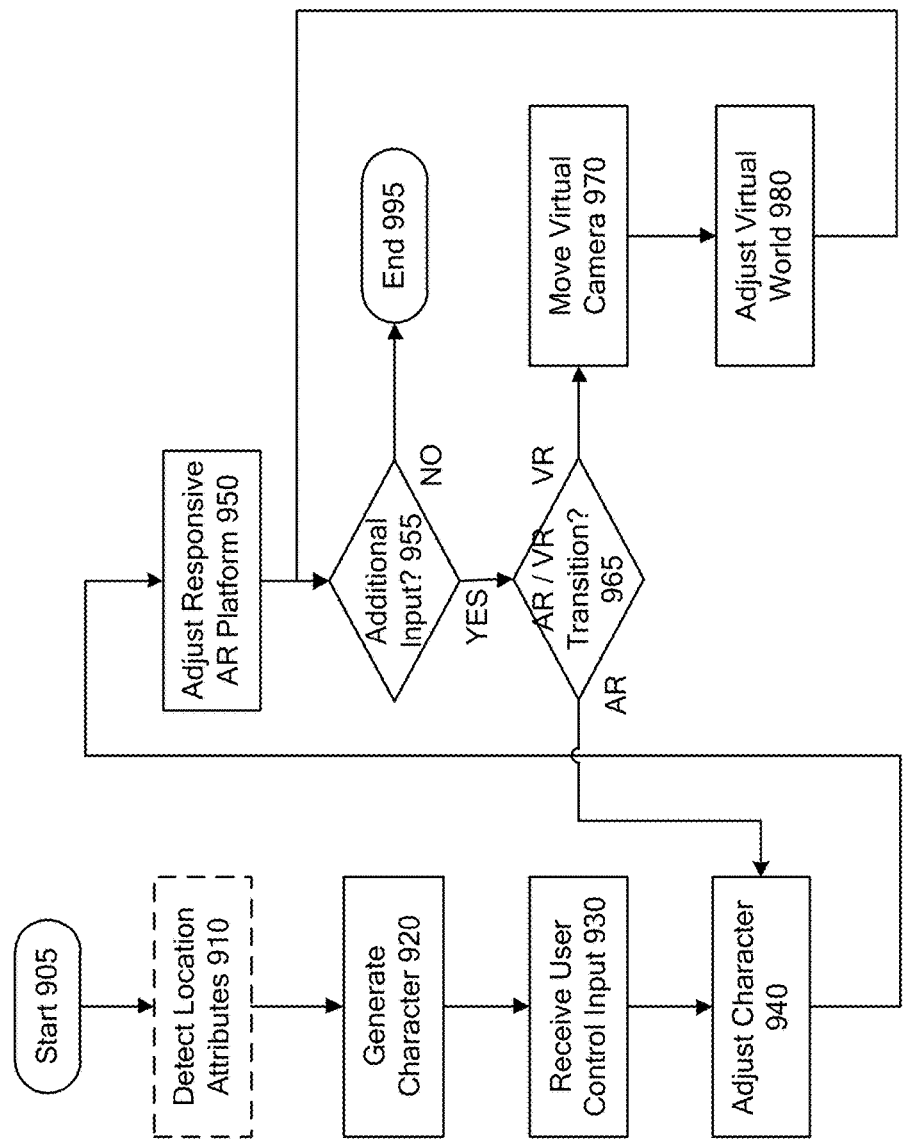
FIG. 9 is a flowchart of augmented reality and virtual reality remote camera tracking.

FIG. 9 is a flowchart of augmented reality and virtual reality remote camera tracking. This process has a start 905 and an end 995, but also repeats internally as the process continues. The process may begin each time the AR platform's camera(s) are moved or begin operating within a new space. This flowchart describes the way in which the AR platform 320 is operated to adjust its associated camera(s) 323 to track an augmented reality object or character as it moves about in a physical space (e.g. a character moving about as controlled by a user of a mobile device 310). This will generally be slightly different than the race car example above. Here, there may or may not be a visible component of the AR platform 320 within the image data. Instead, the AR platform 320 may merely act as a real-world tracking camera for an augmented reality character or object.

After the start 905, the attributes of the location may be detected at 910. This step is shown as optional, but may be preferable where available. At this step, the AR platform (e.g. AR platform 320 in FIG. 3) uses its camera(s) 323 to capture images of the surrounding area. There may be a run-through or a pattern for moving about in a space (e.g. a drone traversing an area) in order to capture sufficient images of a location or space to enable detection of the attributes to take place. After that, the image data may be passed to the mobile device 310 and object recognition 313 may use the captured image data to generate a three-dimensional map of the location. The map may also be based upon infrared or other depth-related data provided as a part of the image data. The map need not be particularly precise, but a generalized layout may be helpful as the AR platform 320 moves about so that the AR platform 320 avoids running into walls and other objects as it moves within the location.

The next step is to generate the augmented reality character at 920. Although described as a character, the augmented reality character may be a car, a tree, a setting, a background, or virtually any other object or set of objects. But, for purposes of this description, it will be preferable if the augmented reality object is capable of movement, at the direction of a user of a mobile device 310. As a result, the augmented realty character will be described as a character for the remainder of the description of this and the following two figures.

The character generated may be, for example, a person who is projected using augmented reality into the physical space. The three-dimensional map generated at 910 may be helpful in ensuring that the character does not appear in the middle of a wall or in the middle of another physical object.

The AR/VR software 311 may intelligently project the character into the location to avoid clipping through actual objects.

The character is generated in images shown on a display, like display 314, that are captured by the AR platform 320 as image data and transmitted to the mobile device 310 for display. The AR/VR software 311 may generate the character as an augmented reality object within the physical space.

Next, user control input may be received at 930. Previously, the user control input adjusted the AR platform 320 itself in the racing example. Here, the user control input is received by the mobile device 310 and is intended to be direction to the augmented reality character itself. The control input may promptly cause the character to move, though there is no virtual camera to follow this character around in the real world. Instead, the AR platform 320 must keep the augmented reality character in "frame" of the video.

To aid in this, the AR/VR software 311 may impose restrictions on the speed of movement or the direction (e.g. only linear movement like a platformer). In another example, the AR platform 320 may be a flying drone that hovers about in the space and can react relatively quickly to changes in the character's movement. The AR platform 320 may keep sufficient distance and rely upon digital zoom, such that it can track an augmented reality character as it moves within a physical space. The AR platform 320's camera(s) 323 may also be capable of panning and rotation so as to more easily keep augmented reality characters in frame.

In response to the user control input, the character may be adjusted at 940. This adjustment may be merely to cause the character to jump or squat within the physical world. In another example, this may cause an augmented reality plane to do a barrel roll or shoot its weapons. The adjustment may be to move from side to side or to jump onto another augmented reality object or onto a real object in the physical world. In the case of the latter, the detected location attributes (e.g. generation of even a crude three-dimensional model of the space) may be helpful to ensure that the augmented reality character can jump on "top" of those objects.

In response to the user control input at 930 and the character adjustment made at 940, the AR platform is adjusted at 950. As indicated above, the AR platform 320 operates to maintain the augmented reality character within the frame of the image data being captured by the AR platform 320. The AR platform 320 is not directly controlled. As it moves, it may take into account the attributes of the physical space detected at 910. In this way, it can avoid running into walls or other objects.

The adjustment at 950 may also take into account any limitations or objectives imposed by the AR/VR software 311. For example, if the experience is like a platformer with a goal at one end of the physical living room, then the AR platform 320 may anticipate that the character will, overall, move toward that goal and not away from it. Therefore, the AR platform 320 may pan to a space behind the character to ensure that the character remains in frame on its way to the goal.

Though described above as intelligently tracking the augmented reality character, the AR platform 320 may be directly controlled in some cases, though those controls are distinct from those of the augmented reality character. In these cases, separate controls may be used to cause the AR platform 320 to move relative to the character. For example, the movement requested by a user may not be directly translated, but may all be completed relative to the augmented reality character so that the character remains in frame and avoids hitting objects or walls in the physical world.

An individual may wish to have a different view of his or her augmented reality character and, thus, may instruct the AR platform 320 (and its camera(s) 323) to move to the left or right or up or down. The AR platform 320 may respond to those instructions, while rotating the camera(s) 323 to keep the augmented reality character in frame. In other cases, the camera(s) 323 may be relatively "fixed" so that the user has no or very limited control relative to his or her character.

Next, additional input may or may not be received at 955. If not ("no" at 955), then the process ends at 995. The process may begin again if subsequent movement is detected or if the AR platform 320 or AR/VR software 311 is initialized again.

If additional input is received ("yes" at 955), then the process continues. The additional input is preferably input instructing the character to move or adjust, but may be input directly controlling the camera or may be other input that may require adjustment of the character, the images displayed on the display 314 or the AR platform 320.

Next, a determination is made whether there has been (or the requested input caused) an AR/VR transition at 965. If not ("AR" at 965), then the process continues with adjustment of the character at 940 and adjustment of the AR platform at 950 as described above.

If an AR/VR transition is made ("VR" at 965), this means that the control input caused the character to transition between an augmented reality overlay within the real world and a wholly virtual reality environment. As discussed above the virtual reality environment is one in which all of its elements are computer generated. This transition may take place, for example, through an augmented reality "portal" or by a door-opening transition animation, e.g., a "flash" animation or other symbolic indication on the display 314 that the augmented reality character being followed by the AR platform 320 in the real world has requested transition to or been transported to a virtual reality world.

This virtual world is notable with respect to the present disclosure in that it cedes responsibility of movement of the AR platform 320 relative to the character once that transition is made. So, an AR platform 320 camera(s) 323 can follow an augmented reality character as described above so long as that augmented reality character is operating with the real, physical world. Once the character transitions to an entirely virtual reality, that AR platform 320 need no longer follow that character at all.

Instead, a virtual camera can move, relative to the character at 970. This virtual camera may take its starting point and position from the AR platform 320 position relative to the character and other objects. The virtual reality may begin, as directed by the AR/VR software 311, from a place of simply overlaying a complete augmented reality over and around the augmented reality character. Then, when the virtual camera takes over at 970, the AR platform 320 may stop moving, return to a charging station (manually or automatically), hover awaiting the augmented reality character's return from virtual reality, or otherwise become non-responsive to user commands.

Unlike the augmented reality character within the physical world, now the AR/VR software 311 has to generate the entirety of the world, including the character. So, the world itself must be adjusted at 980 to correspond to the movements requested by the user for the character. This may be as simple as updating the world with the distant horizon as a character moves further into the virtual reality environment. Alternatively, it may be rendering portions of the world not visible previously as a user adjusts the virtual reality camera. The character within that world may also be adjusted as directed by the control input.

Next, a determination whether additional input was received at 955 is made again. If that additional input causes no transition, the process continues within VR at 970 and 980 with the camera being virtual.

If an AR/VR transition to AR occurs ("AR" at 965), then the character must be adjusted at 940 again within the physical world and the AR platform 320 must be adjusted at 950. It is preferable if the AR/VR transitions have some warning so that the AR platform 320 may adjust itself to better match the relative location to the character within the virtual reality environment before the transition occurs. In that way, the transition can be relatively seamless. Though, other transitions, with perspectives shifting to the real camera of the AR platform 320 from the virtual camera of the virtual reality environment to the actual camera(s) 323 of the AR platform 320 may also take place.

The VR transition may be a relatively seamless way to provide a charging opportunity for the AR platform 320. The AR platform 320 likely will rely upon battery power and may function only for a limited time without charging again. Transitions to virtual reality can offload all of the camera tracking to a traditional virtual camera, as is known within game engines and virtual reality environments. During this time, the AR platform 320 can return to a base station to charge or replace batteries. Once the AR platform 320 is ready, it may return and a transition back to an augmented reality combining the real world and augmented reality characters can begin again.

Figure 10:
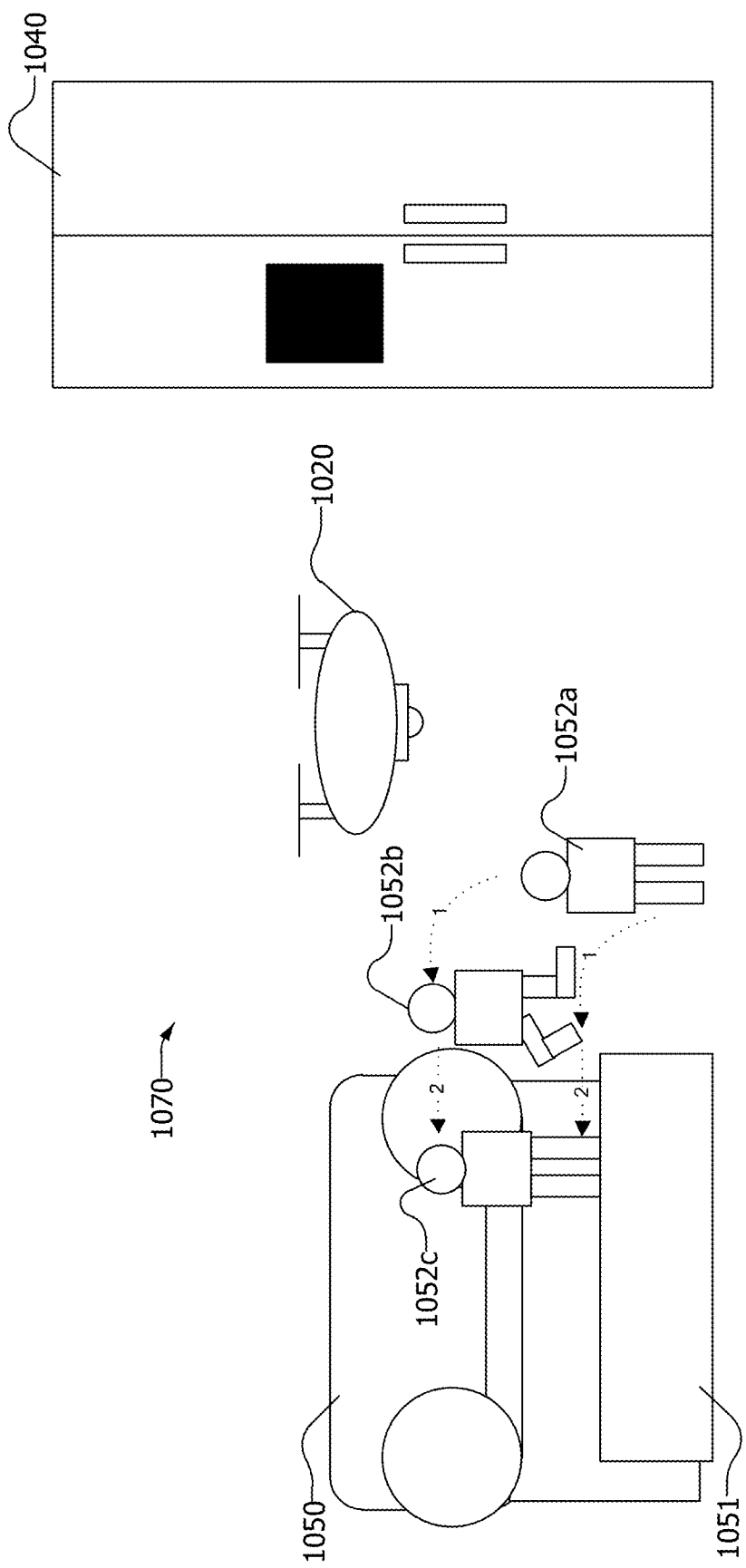
FIG. 10 is an example of augmented reality remote camera tracking.

FIG. 10 is an example of augmented reality remote camera tracking. Here, we see the same living room 1070 we saw previously in FIG. 5. The same chair 1050 and refrigerator 1040 are present.

Here, an AR platform 1020 is a flying drone incorporating at least one camera. The AR platform 1020 may capture image data (live video) of the living room 1070 with the AR/VR software 311 (FIG. 3) overlaying an augmented reality character 1052a at time t within the scene.

A user may request movement of the augmented reality character 1052a such that the user jumps on top of an ottoman 1051 near the chair 1050. The augmented reality character 1052b (now, at time t+1) is mid-air about to land on the ottoman 1051. At time t+2, the augmented reality character 1052c is standing atop the ottoman.

During all of time t, t+1, and t+2; the AR platform 1020 may track the augmented reality character 1052a, 1052b, and 1052c as though he were actually in the physical world. The AR platform 1020 may have previously scanned the living room, as discussed above, to have a general layout of the three-dimensional environment, and may pass that information along to the AR/VR software 311 so that the character 1052c is able to stand atop the ottoman 1051 because the AR/VR software 311 is aware that it is a three-dimensional object that sits a foot or two above the floor. The AR platform 1020 may track the augmented reality character 1052a, 1052b, and 1052c as it moves about in the physical space, intelligently or manually adjusting to the location of that character 1052a, 1052b, and 1052c as movements are made.

Figure 11:
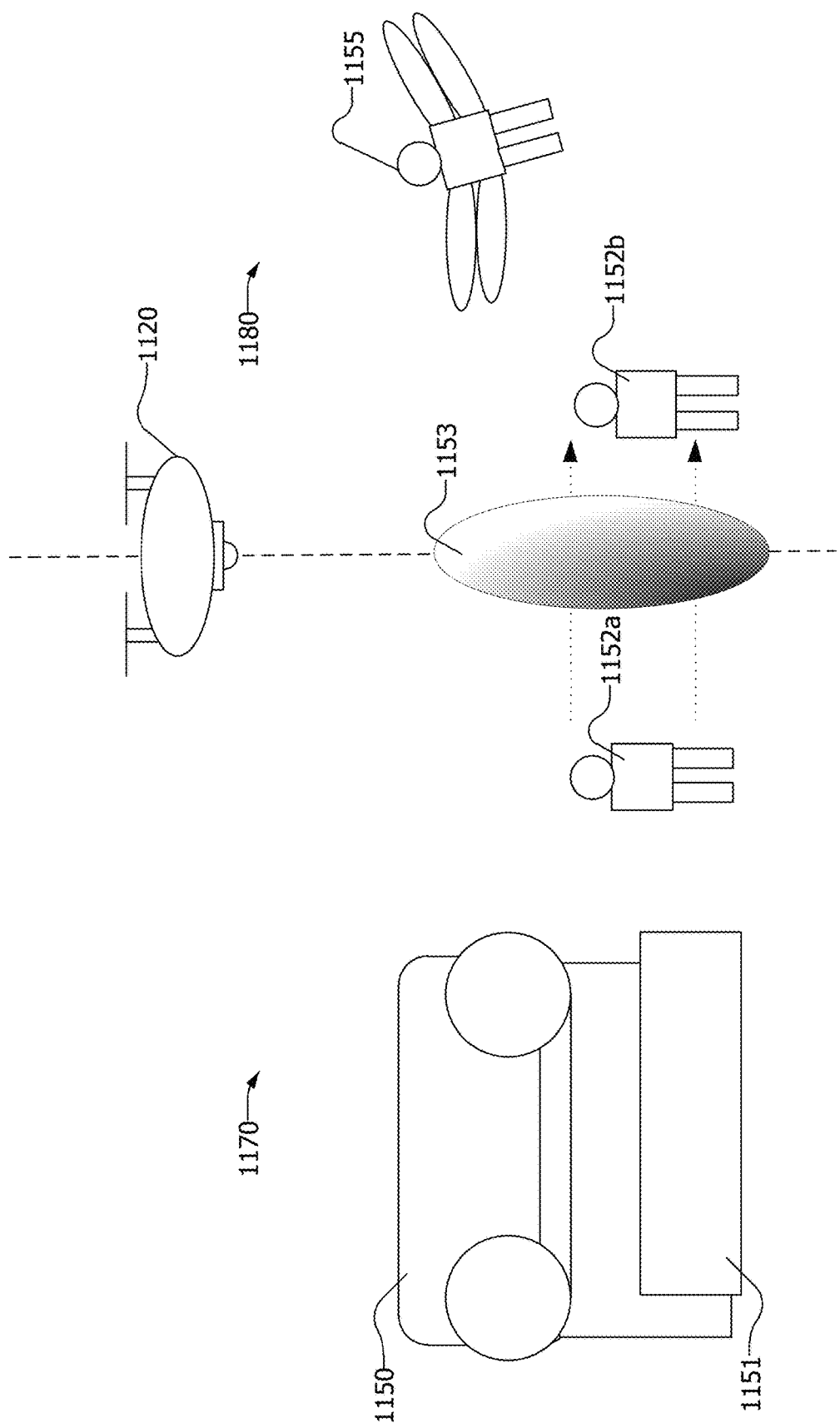
FIG. 11 is an example of augmented reality into virtual reality remote camera tracking.

FIG. 11 is an example of augmented reality into virtual reality remote camera tracking. The same living room 1170, with the same chair 1150 and ottoman 1151 is shown. The refrigerator (1040 in FIG. 10) is missing because that area is being generated in virtual reality 1180.

The augmented reality character 1152a is shown in front of a portal 1153. As discussed above, various transitions are possible, the portal 1153 is only one example. Transitions may be fade-to-black followed by fade-up in a virtual reality environment, or may be seamless such as portals, doors, windows, or slow transitions from reality to virtual reality.

At time t, the augmented reality character 1152a is within the living room 1170. The AR platform 1120 is tracking the movement of the augmented reality character 1152a as it moves within the living room 1170.

At time t+1, the augmented reality character 1152b has moved into virtual reality 1180 through the portal 1153 as directed by a user of a mobile device 310. The virtual reality may have other characters, like fictional character 1155, present and may be entirely rendered by the AR/VR software 311. The user may elect to instruct the augmented reality character 1152b to transition back to reality.

During the time within the virtual reality 1180, the AR platform 1120 may merely hover awaiting further augmented reality character 1152a movement within the physical living room 1170, sit still, or return to a charging dock or land to conserve power.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system for remote camera tracking comprising:
 a moveable augmented reality platform including:
  a camera for capturing image data of an area in front of a camera lens on the moveable augmented reality platform,
  a communications interface for transmitting the image data to a remote computing device and for receiving instructions from the remote computing device, a locomotive system for moving the movable augmented reality platform from one physical location to another; and the remote computing device, including a processor and non-volatile memory, separate from the moveable augmented reality platform, further including:

the processor which is programmed to:

aggregate the image data received over a series of control instructions or a period of time while the movable augmented reality platform moves through a physical space to define a course;

use image processing to identify visual landmarks within the image data at predetermined points within the physical space;

define the course, comprising a route made up of a traversal along the predetermined points by the movable augmented reality platform within the physical space, through which an event involving the movable augmented reality platform is to take place based upon the visual landmarks;

a display for displaying the image data on the remote computing device in conjunction with augmented reality media superimposed over the image data;

a user interface for receiving control input from a user for control of the locomotive system to move the moveable augmented realty platform from one physical location to another; and a second communications interface for receiving the image data and for transmitting control instructions based upon the control input to the moveable augmented reality platform.

2. The system of claim 1 wherein the remote computing device:

identifies at least one visual landmark within the image data; and defines a condition of a competitive game based upon identification of the at least one visual landmark within the image data.

3. The system of claim 2 wherein the visual landmark is a machine-readable element.

4. The system of claim 1 wherein:

the movable augmented reality platform further includes at least one motion sensor for generating motion data based upon motion of the moveable augmented reality platform;

the second communications interface is further for receiving the motion data; and the remote computing device tracks the movement of the movable augmented reality platform through the course to a victory condition using the visual landmarks.

5. The system of claim 4 wherein the remote computing device defines the course using at least one of the motion data and the control instructions.

6. The system of claim 1 wherein the image processing to identify the visual landmarks is reliant upon the image data from the movable augmented reality platform and from at least one other movable augmented reality platform operating within the physical space along the course.

7. The system of claim 1 wherein the augmented reality media includes an on-screen character, generated by the remote computing device, overlaid over and appearing to operate the movable augmented reality platform with actions corresponding the control instructions.

8. The system of claim 1 wherein:

the movable augmented reality platform further includes at least one motion sensor for generating motion data based upon motion of the moveable augmented reality platform;

the second communications interface is further for receiving the motion data; and the augmented reality media on the display is altered based, at least in part, upon the motion data.

9. A method of remote camera tracking comprising:

capturing image data of an area in front of a camera lens using a camera on a moveable augmented reality platform including a locomotive system for moving the movable augmented reality platform from one physical location to another;

transmitting the image data to a remote computing device;

aggregating the image data received over a series of control instructions or a period of time while the movable augmented reality platform moves through a physical space to define a course;

using image processing to identify visual landmarks within the image data at predetermined points within the physical space;

defining the course, comprising a route made up of a traversal along the predetermined points by the movable augmented reality platform within the physical space, through which an event involving the movable augmented reality platform is to take place based upon the visual landmarks displaying on a display of the remote computing device, distinct from the augmented reality platform, the image data in conjunction with augmented reality media superimposed over the image data;

receiving control input on the mobile computing device from a user for control to move the moveable augmented realty platform;

transmitting the control input to the augmented reality platform; and moving the movable augmented reality platform using the locomotive system from one physical location to another in response to the control input.

10. The method of claim 9 further comprising:

identifying at least one visual landmark within the image data; and defining a condition of a competitive game based upon identification of the at least one visual landmark within the image data.

11. The method of claim 10 wherein the visual landmark is a machine-readable element.

12. The method of claim 9 further comprising:

generating motion data by at least one motion sensor based upon motion of the moveable augmented reality platform;

receiving the motion data at the mobile computing device; and tracking movement of the movable augmented reality platform through the course to a victory condition using the visual landmarks.

13. The method of claim 12 wherein the remote computing device defines the course using at least one of the motion data and the control instructions.

14. The method of claim 9 wherein the image processing to identify the visual landmarks is reliant upon the image data from the movable augmented reality platform and from at least one other movable augmented reality platform operating within the physical space along the course.

15. The method of claim 9 wherein the augmented reality media includes an on-screen character, generated by the remote computing device, overlaid over and appearing to operate the movable augmented reality platform with actions corresponding the control instructions.

16. The method of claim 9 further comprising:
- generating motion data by at least one motion sensor based upon motion of the moveable augmented reality platform;
- receiving the motion data at the mobile computing device; and
- altering the augmented reality media shown on the display based, at least in part, upon the motion data.

* * * * *